United States Patent [19]

Fismer et al.

[11] 4,217,224
[45] Aug. 12, 1980

[54] FILTER PLATE

[75] Inventors: William L. Fismer, Verona; William A. Beach, Milltown, both of N.J.

[73] Assignee: Envirotech Corporation, Menlo Park, Calif.

[21] Appl. No.: 964,227

[22] Filed: Nov. 28, 1978

[51] Int. Cl.² ............................................. B01D 25/12
[52] U.S. Cl. .................................................. 210/231
[58] Field of Search ....................... 210/231, 227–230, 210/224

[56] References Cited

U.S. PATENT DOCUMENTS

| | | | |
|---|---|---|---|
| 1,971,972 | 8/1934 | Adam | 210/231 |
| 2,122,259 | 6/1938 | McKenna | 210/231 |
| 3,497,065 | 2/1970 | Johnson, Jr. | 210/231 |
| 3,543,938 | 12/1970 | Busse | 210/231 |
| 3,615,015 | 10/1971 | Busse et al. | 210/231 |
| 3,931,014 | 1/1976 | Hembash et al. | 210/231 |
| 4,053,416 | 10/1977 | Harold et al. | 210/230 |

FOREIGN PATENT DOCUMENTS

| | | | |
|---|---|---|---|
| 1027343 | 5/1953 | France | 210/231 |
| 13160 | of 1895 | United Kingdom | 210/231 |
| 1410645 | 10/1975 | United Kingdom | 210/231 |

Primary Examiner—Theodore A. Granger
Attorney, Agent, or Firm—Michael J. Pollock; Robert E. Krebs

[57] ABSTRACT

The invention provides a filter plate of increased size which includes a reinforcing bar which subdivides the inner face of the plate into distinct drainage areas. The drainage areas are in liquid flow communication with each other via recess formed in the reinforcing bar. The plate is provided with raised spacing elements which are positioned in a special pattern to provide uniform deflection across the plate when the filter press is under pressure. The plate is further provided with a staggered, offset pattern of drainage ribs which enhances filter cloth support, increases plate strength and improves liquid flow around the spacing elements.

13 Claims, 4 Drawing Figures

FILTER PLATE

BACKGROUND OF THE INVENTION

1. Field of the Invention

The present invention relates to filter press machines for separating solids from liquids and, more particularly to improved polypropylene filter plates for use in such machines.

2. State-of-the-Art

Plate-type pressure filtration machines, typically called filter presses, are well known for separating solids from liquid slurries and for dewatering industrial and municipal wastes. A filter press is described, for instance, in U.S. Pat. No. 3,633,747 to Fismer. Recent efforts to enhance the efficiency of filter press machines have focussed upon increasing the effective filtering area presented by the individual filter plates of the press, thereby increasing the quantity of liquid processed per operating cycle of the machine.

One way to increase filtering area of a filter plate is, of course, to merely increase the size of the plate. However, large filter plates have increased susceptibility to deformation and breakage. For example, even small pressure differences across a large plate can cause the plate to crack.

In an effort to reduce breaking or deformation of large filter plates, workers in this art have suggested the installation of spacing elements, or stay bosses, in the space between adjacent filter plates to provide support in addition to that provided by the borders of the adjacent plates. It is also known to subdivide the filtering area of a plate into a number of filtering sectors, isolated from one another, by providing raised separating walls which extend across the filtering area between opposing borders of the plate. A filter plate which incorporates these features is disclosed in U.S. Pat. No. 3,615,015.

A disadvantage of filter plates having isolated filtering sectors is that individual liquid feed passages are required for each of the isolated sectors. These passages, in turn, reduce the effective filtering area of the plate, reduce the efficiency of the filter press, and increase the cost and complexity of the overall filtering system. Also, isolated filtering sectors, with their separate supply systems, enhance the possibility of pressure differences across a filter plate and, thus, enhance the probability of plate deformation and breakage.

OBJECTS AND SUMMARY OF THE INVENTION

The primary object of this invention is to provide an improved filter plate for filter press machines. To this end the present invention, generally speaking, provides a polypropylene filter plate of increased size which includes a reinforcing bar which subdivides the plate into two filtering areas in liquid-flow communication with each other via recesses formed in the reinforcing bar. In the preferred embodiment of the present invention spacing elements are positioned in a special pattern so that plate deflection is uniform throughout the plate. Further a staggered, offset drainage pattern of ribs and grooves is provided so that filter cloth support is enhanced, plate strength is increased, and liquid flow around the spacing elements is improved.

A further understanding of the present invention will be gained by reference to the following description and to the appended drawings, which are offered by way of illustration only and not in limitation of the invention, the scope of which is defined by the appended claims and equivalents to the structure, materials and acts recited therein.

DETAILED DESCRIPTION OF A PREFERRED EMBODIMENT

Figure 1:
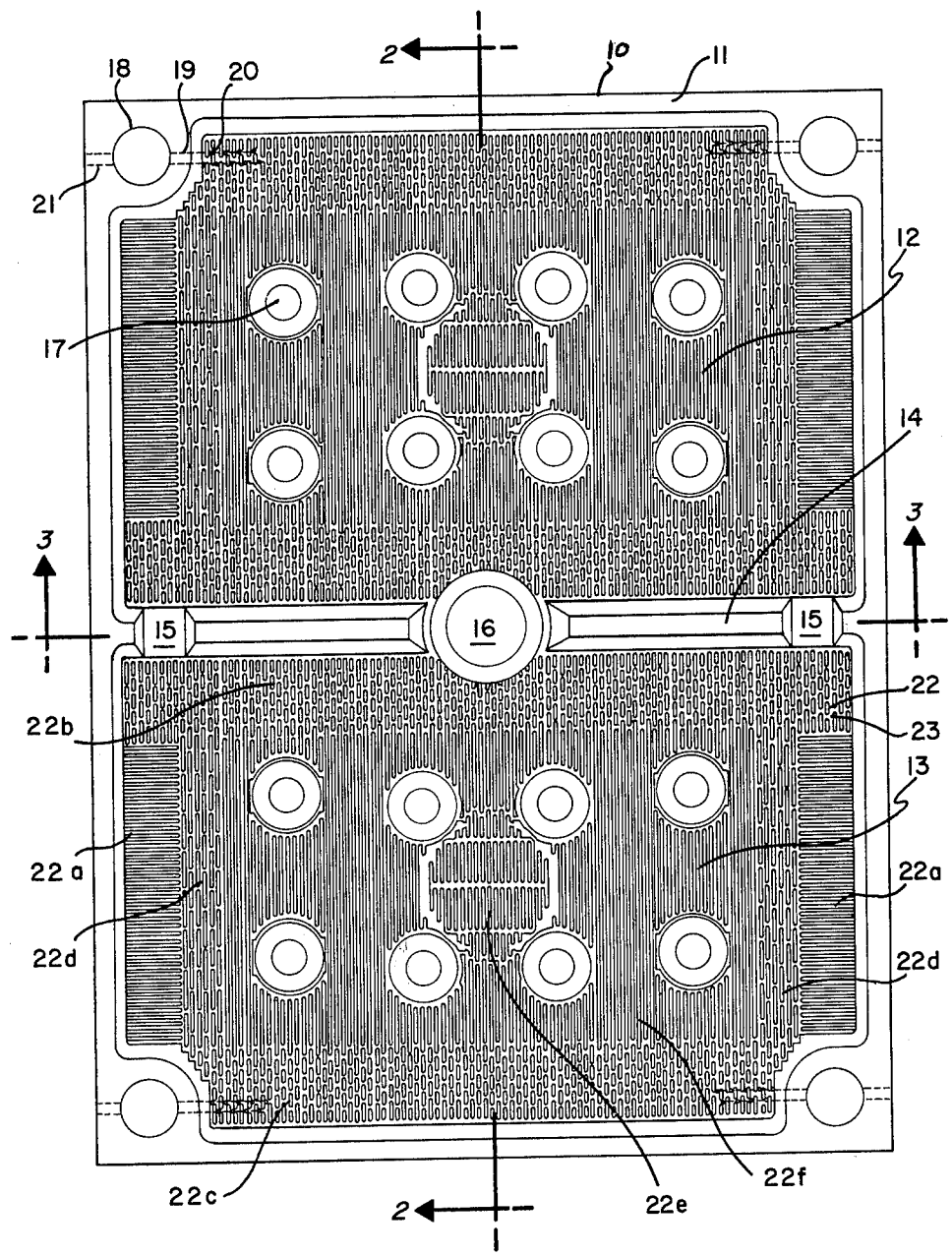
FIG. 1 is an elevational view of a filter plate according to the present invention.
Figure 2:
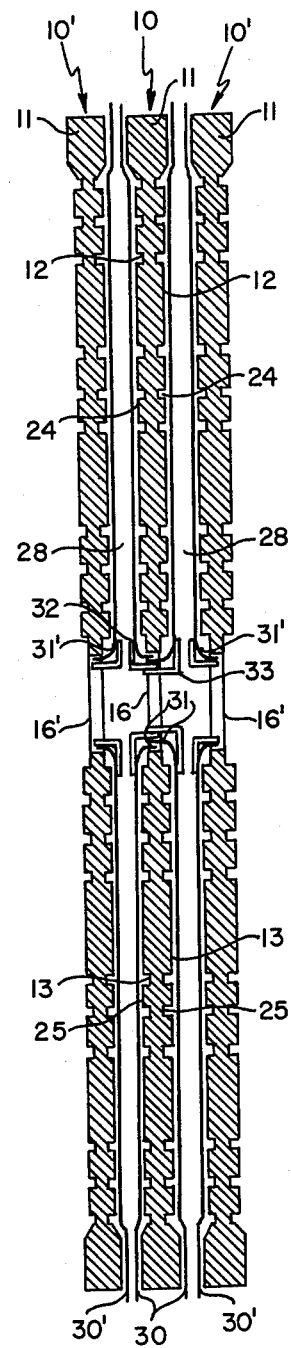
FIG. 2 is a sectional view taken along line 2—2 of FIG. 1 but showing three adjacent filter plates; reference numerals which include a prime (') indicate elements corresponding to those of the filter plate of FIG. 1.

As illustrated in FIGS. 1 and 2, the filter plate 10 has a generally planar inner face and a peripheral rim 11 which extends completely about the margin of the plate and is integral therewith to define the border of the plate. The rim 11 of the plate 10 extends above the plane of the inner face so that when the filter plates are mounted on a filter press machine (not shown), the rims of adjacent plates abut to form liquid-tight seals around the faces of adjacent plates.

Figure 3:
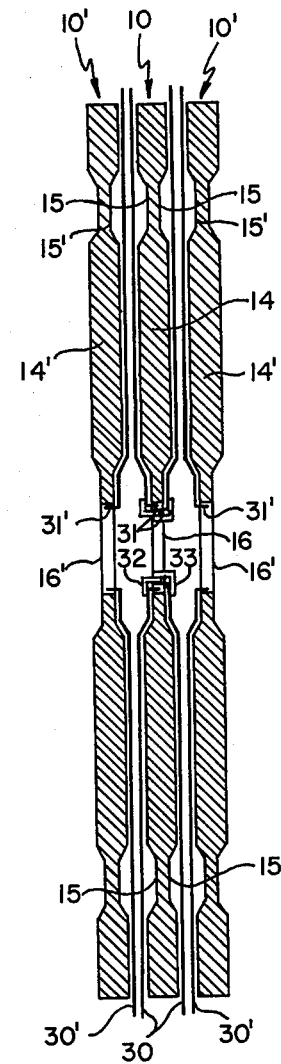
FIG. 3 is a sectional view taken along line 3—3 of FIG. 1, also showing three adjacent plates.

In the embodiment illustrated in FIG. 1, a transverse reinforcing bar 14 extends laterally across the face of the plate 10 and is integral with the rim 11 at the opposite borders of the filter plate. Thus, reinforcing bar 14 divides the face of plate 10 into two distinct sectors 12 and 13, hereinafter called drainage areas. As shown in FIG. 3, the reinforcing bar is raised to the same extent as is the rim 11 so that the corresponding reinforcing bars 14 and 14' of adjacent filter plates 10 and 10' sealingly abut when the plates are pressed together. Opposite sides of plate 10 are identical.

When a set of filter plates is mounted on a press machine in abutting relationship, as shown in FIG. 2, filter cloths 30 and 30' are disposed between filter plates 10 and 10'. The result is that a slurry receiving chamber 28 is formed between the filter cloths 30 and 30'. Likewise, a pair of filtrate drainage chambers 24 and 25 are formed between filter cloth 30 and drainage areas 12 and 13 respectively.

As shown in FIGS. 1 and 3, reinforcing bar 14 has recesses or notches 15 formed therein to provide slurry and filtrate flow communication between adjacent drainage areas 12 and 13 on the face of the plate 10. Thus, when adjacent filter plates 10 and 10' are sealingly engaged, as shown in FIG. 3, filtrate can flow past reinforcing bar 14 between filtrate chambers 24 and 25 to insure equality of pressure in both drainage areas, by means of vertical drainage grooves at the bottom of the notches (not shown).

In the embodiment illustrated in FIG. 1, filter plate 10 has formed therein, near the mid-point of reinforcing bar 14, a feed opening 16 which extends through the width of the plate. Filter cloth 30 includes a corresponding center opening 31. Conventional clip members 32 and 33 fasten together to sealingly secure the edge of center opening 31 of the filter cloth 30 about the opening 16 in filter plate 10. This clip arrangement illustrates but one means for fastening cloth 30 to plate 10. One skilled in this art will readily recognize that various other methods could be utilized to accomplish the same result. For example, the cloth on each side of the plate may be joined together at the center feed opening by sewing the ends of a cylindrical tube to each cloth or, alternatively, by sewing the two cloths directly together. Regardless of the means utilized, when filter cloth 30 is fastened to the feed opening 16 of plate 10 and when adjacent plates 10 and 10' are sealingly engaged at rim 11 and reinforcing bar 14, adjacent filter cloths 30 and 30' form, as shown in FIG. 2, feed liquid chamber 28 into which the slurry to be filtered may be introduced via feed opening 16.

Figure 4:
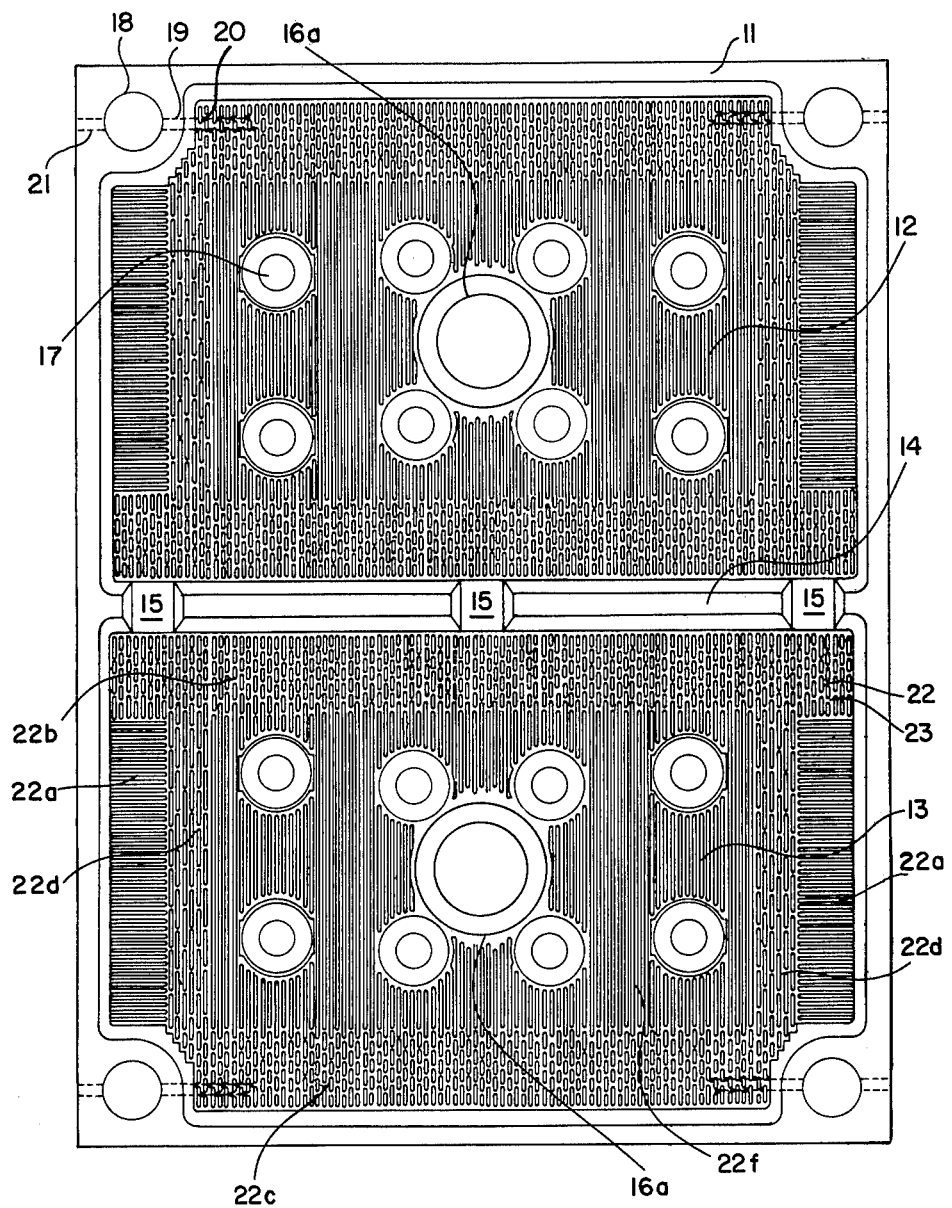
FIG. 4 is an elevational view of an alternative embodiment of the filter plate according to the present invention.

Those familiar with this art will also appreciate that, as shown in FIG. 4, center opening 16 can be replaced by an individual feed opening 16a formed in each of the drainage areas. In such an embodiment, additional recesses 15 could be provided in the reinforcing bar 14. FIG. 4 shows three such recesses 15 in the reinforcing bar 14.

In the embodiments illustrated in both FIG. 1 and FIG. 4, recessed drainage areas 12 and 13 have formed thereon raised spacing elements 17 which are frusto-conical members with flat tops. Spacing elements 17 are positioned so that when adjacent filter plates are engaged, the corresponding spacing elements of adjacent filter plates mate in abutting alignment to provide support for the filter plate in the well known manner. When disposed in the illustrated arrangement, spacing elements 17 provide uniform deflection across filter plate 10 during operation of the filter press. More specifically, the illustrated spacing element arrangement provides for uniform deflection at all of the high stress areas of the plate including between the spacing elements 17, between the spacing elements 17 and the rim 11 of the plate and between the spacing elements 17 and reinforcing bar 14. The illustrated plate includes eight spacing elements 17 per each drainage area, with the elements arranged equally-spaced in four rows of two, the center line of each row being perpendicular to reinforcing bar 14. It should be observed that the pairs of spacing elements located nearest the square corner formed by reinforcing bar 14 and rim 11 are positioned nearer to bar 14 than are the remaining pairs of spacing elements.

The drainage areas 12 and 13 have formed therein a specific pattern of ribs 22 and grooves 23. As shown in FIG. 1, ribs 22 are arranged in a number of arrays. The illustrated rib arrangement, in addition to providing additional strength to the plate, provides excellent filter cloth support so that no perforated sheets are needed under the cloth. That is, by utilizing this special drainage design, the filter plate of the present invention may be used at 225 psi operating pressure without any special cloth support. One of the reasons for this excellent support is the high percentage of support area provided by the pattern. Another reason for such support is that the openings between the ribs are staggered so that no two openings are adjacent.

In addition to providing excellent cloth support, the staggered rib design also provides important advantages while molding the plates. The staggered ribs eliminate excessive localized shrinkage of the polypropylene when the molten filter plate cools. The shrinkage is distributed over the entire length of the filter plate, rather than being concentrated in a small area.

The arrangement of ribs in each drainage area may be described in terms of distinct arrays of ribs. In the first array, side-by-side ribs 22a extend parallel to reinforcing bar 14 from the rim 11 on both sides of the drainage area. Ribs 22a are all of equal length.

In a second array, ribs 22b extend perpendicular to reinforcing bar 14 from reinforcing bar 14 for a distance toward the center of the drainage area. Ribs 22b are of varying length, are staggered so that the ends of adjacent ribs 22b are not coincident, and are disposed in side-by-side parallel arrangement.

In a third array, ribs 22c extend perpendicular to the reinforcing bar 14 from the rim 11 a distance toward the center of the drainage area. Ribs 22c are of varying length, are staggered so that the ends of adjacent ribs 22c are not coincident, and are disposed in side-by-side parallel arrangement.

In a fourth array, ribs 22d extend perpendicular to reinforcing bar 14 on both sides of the drainage area. Ribs 22d are of varying length, are staggered so that the ends of adjacent ribs 22d are not coincident, and are diposed in side-by-side parallel arrangement.

In the embodiment shown in FIG. 1, ribs 22e are disposed in a fifth generally circular array located centrally in the drainage area. Ribs 22e are of varying length and are disposed perpendicular to reinforcing bar 14, and are disposed in side-by-side parallel arrangement. Because of the use of individual feed openings 16a in the embodiment of FIG. 4, ribs 22e are not present in that embodiment.

In a final array, ribs 22f cover the remaining portion of the drainage area surrounding spacing elements 17. Ribs 22f are disposed perpendicular to reinforcing bar 14, are of varying length, and are disposed in side-by-side parallel arrangement.

The drainage pattern is identical on both sides of the plate. In the preferred embodiment, the drainage pattern has approximately 9/32" tops and 7/32" spaces. The cross drainage design at the top and bottom of the plate encourages flow between the ribs to each corner of the plate. Also, as shown in FIG. 2, drainage areas 12 and 13 are gradually bevelled at their periphery to meet the outer rim 11 of the plate 10.

Formed in the rim 11, preferably in the corners as shown in FIG. 1, are discharge eyes 18 which extend through the width of the plate. Extending from discharge eyes 18 within the inner portion of plate 10 are drainage ports 19. Formed in the surface of drainage areas 12 and 13 in flow communication with drainage ports 19 are drainage holes 20. In the preferred embodiment, drainage holes 20 are about ¼" diameter. Formed in the outer body 11 of the plate 10 in flow communication with discharge eyes 18 are auxiliary ports 21. Auxiliary ports 21 are normally plugged in the conventional manner. In the preferred embodiment the drainage area of the plate is slightly thicker in the corners so that the molded ports will not weaken the plate.

The operation of the above-described plates in a pressure type filter press may now be readily understood. During filtration, adjacent filter plates 10 and 10' are sealingly engaged as shown in FIGS. 2 and 3. The feed openings 16 and 16' of the adjacent plates form a passage through which a liquid slurry to be filtered is introduced under pressure to slurry receiving chamber 28. Filter cloth 30 is pervious to the liquid but impervious to the solids in the slurry. Thus, the pressure differential between slurry receiving chamber 28 and filtrate chambers 24 and 25 causes liquid to flow through cloth 30 while solids in the liquid are retained in slurry receiving chamber 28. Liquid passing through filter cloth 30 to filtrate chamber 24 and 25 is directed along drainage areas 12 and 13 respectively toward discharge eyes 18 by ribs 22 and grooves 23. Filtrate also flows between chambers 24 and 25 through the passage formed by flow-through recesses 15 and cloth 30. Pressure is thereby equalized in the chambers 24 and 25. Directed by the ribs and grooves, filtrate flows into drainage holes 20, through drainage ports 19 and into discharge eyes 18 from which it is discharged from the press.

We claim:

1. A filter plate for use in a filter press machine for separating solids from liquids, the filter press machine being of the type wherein a plurality of filter plates are pressed together in abutting relationship and filtration is accomplished through a filter cloth disposed between adjacent filter plates, comprising:
    a. a generally planar inner face and a peripheral rim which extends completely about the margin of said inner face and is integral therewith to define the border of the plate, said rim extending above the plane of said inner face so that, when adjacent plates on a press are pressed together in abutting relationship, the rims of two adjacent plates form a liquid tight seal around said inner faces of the adjacent plates; and
    b. a transverse reinforcing bar which is raised from said planar inner face to the same extent as said rim and which extends laterally across said inner face from one side of the plate to the opposite side so that corresponding reinforcing bars of adjacent filter plates sealingly abut when the plates are pressed together, said reinforcing bar being integral with said rim at the opposite sides of the plate to divide said inner face into two distinct drainage areas, said reinforcing bar having formed therein at least one recess to provide liquid flow communication between said two drainage areas when adjacent filter plates are pressed together in abutting relationship.

2. A filter plate according to claim 1 wherein the plate is polypropylene.

3. A filter plate according to claim 1 wherein both sides of the plate are identical.

4. A filter plate according to claim 1 further comprising a plurality of raised spacing elements formed on each of said drainage areas of said inner face of the plate, said spacing elements positioned so that when adjacent plates on a press are engaged said corresponding spacing elements of adjacent plates are in alignment.

5. A filter plate according to claim 1, further comprising at least eight raised spacing elements per each of said drainage areas of said inner face of the plate, said eight spacing elements in an area arranged equally-spaced in four rows of two, the center line of each of said rows being perpendicular to said reinforcing bar, the pairs of said spacing elements located nearest the square corner formed by said reinforcing bar and said rim being positioned nearer to said reinforcing bar than are the remaining pairs of said spacing elements, said spacing elements positioned so that when adjacent plates on a press are engaged said spacing elements of adjacent plates are in alignment.

6. A filter plate according to claim 5 wherein said spacing elements are frusto-conical.

7. A filter plate according to claim 1 wherein said drainage areas have formed therein a pattern of ribs and grooves, said ribs being staggered such that the ends of adjacent ribs are not coincident.

8. A filter plate according to claim 7 further including a feed opening formed in the plate near the midpoint of said reinforcing bar.

9. A filter plate according to claim 8 wherein said drainage ribs are arranged in a pattern which is similar in each of said drainage areas, said pattern comprising:
    a. a first array of ribs, said ribs of said first array extending parallel to said reinforcing bar from said rim of the plate on both sides of said drainage area, said ribs of said first array being of equal length and disposed side-by-side;
    b. a second array of ribs, said ribs of said second array extending perpendicular to said reinforcing bar from said reinforcing bar toward the center of said drainage area; said ribs of said second array being of varying length, staggered so that the ends of adjacent ribs within said second array are not coincident, and disposed in side-by-side parallel arrangement;
    c. a third array of ribs, said ribs of said third array extending perpendicular to said reinforcing bar from said rim a distance toward the center of said drainage area, said ribs of said third array being of varying length, staggered so that the ends of adjacent ribs of said third array are not coincident, and disposed in side-by-side parallel arrangement;
    d. a fourth array of ribs, said ribs of said fourth array extending perpendicular to said reinforcing bar on both sides of said drainage area, said ribs of said fourth array being of varying length, staggered so that the ends of adjacent ribs of said fourth array are not coincident, and disposed in side-by-side parallel arrangement;
    e. a fifth generally circular array of ribs positioned centrally in said area, said ribs of said fifth array disposed perpendicular to said reinforcing bar, said ribs of said fifth array being of varying length and disposed in side-by-side parallel arrangement;
    f. a final array of ribs, said ribs of said final array covering the remaining portion of said drainage area around said spacing elements, said ribs of said final array being of varying length disposed perpendicular to said reinforcing bar, and disposed in side-by-side parallel arrangement;
said pattern being so arranged to provide additional strength to the plate and to enhance liquid flow around said spacing elements.

10. A filter plate according to claim 9 wherein said drainage areas are gradually bevelled at their periphery to meet said outer rim of the plate.

11. A filter plate according to claim 7 further including a center feed opening formed in the plate in each of said drainage areas.

12. A filter plate according to claim 11 wherein said drainage ribs are arranged in a pattern which is similar in each of said drainage areas, said pattern comprising:
    a. a first array of ribs, said ribs of said first array extending parallel to said reinforcing bar from said rim of the plate on both sides of said drainage area, said ribs of said first array being of equal length and disposed side-by-side;
    b. a second array of ribs, said ribs of said second array extending perpendicular to said reinforcing bar from said reinforcing bar toward the center of said drainage area; said ribs of said second array being of varying length, staggered so that the ends of adjacent ribs within said second array are not coincident, and disposed in side-by-side parallel arrangement;
c. a third array of ribs, said ribs of said third array extending perpendicular to said reinforcing bar from said rim a distance toward the center of said drainage area, said ribs of said third array being of varying length, staggered so that the ends of adjacent ribs of said third array are not coincident, and disposed in side-by-side parallel arrangement;
d. a fourth array of ribs, said ribs of said fourth array extending perpendicular to said reinforcing bar on both sides of said drainage area, said ribs of said fourth array being of varying length, staggered so that the ends of adjacent ribs of said fourth array are not coincident, and disposed in side-by-side parallel arrangement;
e. a final array of ribs, said ribs of said final array covering the remaining portion of said drainage area around said spacing elements, said ribs of said final array being of varying length disposed perpendicular to said reinforcing bar, and disposed in side-by-side parallel arrangement;

said pattern being so arranged to provide additional strength to the plate and to enhance liquid flow around said spacing elements.

13. A filter plate according to claim 12 wherein said drainage areas of the plate are slightly thicker at their corners.

* * * * *